United States Patent [19]

Wolf et al.

[11] Patent Number: 4,559,972
[45] Date of Patent: Dec. 24, 1985

[54] VALVE FOR USE IN GASIFICATION REACTOR

[75] Inventors: Heinz Wolf, Bad Nauheim; Werner Emmel, Nidda, both of Fed. Rep. of Germany

[73] Assignee: Metallgesellschaft Aktiengesellschaft, Frankfurt am Main, Fed. Rep. of Germany

[21] Appl. No.: 484,335

[22] Filed: Apr. 12, 1983

[30] Foreign Application Priority Data

Apr. 28, 1982 [DE] Fed. Rep. of Germany ....... 3215730

[51] Int. Cl.⁴ ................................................. F16K 3/00
[52] U.S. Cl. ......................... 137/614.11; 137/614.21; 251/279
[58] Field of Search ...................... 137/614.11, 614.13, 137/614.21, 330, 331; 251/279; 193/20, 21

[56] References Cited

U.S. PATENT DOCUMENTS

| | | | |
|---|---|---|---|
| 635,104 | 10/1899 | Linken et al. | 137/614.11 |
| 1,044,124 | 11/1912 | Bessert | 137/614.11 |
| 2,457,526 | 12/1948 | Brown | 137/614.11 X |
| 2,642,086 | 6/1953 | Conklin et al. | 137/614.11 X |
| 3,402,740 | 9/1968 | Perolo | 137/614.11 X |
| 3,804,124 | 4/1974 | Finke et al. | 251/279 X |
| 3,884,649 | 5/1975 | Matthews | 48/202 |

Primary Examiner—A. Michael Chambers
Assistant Examiner—John C. Fox
Attorney, Agent, or Firm—Sprung Horn Kramer & Woods

[57] ABSTRACT

The valve comprises a rotary valve member, which serves to close the inlet port. A pivoted valve arm, which extends from the rotary valve member, and a pivoted link, which engages said valve arm, ensure that a valve disc moves in unison with the rotary valve member to a position in which the valve disc effects a pressuretight closing of the outlet port. The valve is preferably mounted on a reactor for gasifying solid fuels under a pressure of 2 to 150 bars, particularly on the ash discharge side.

1 Claim, 4 Drawing Figures

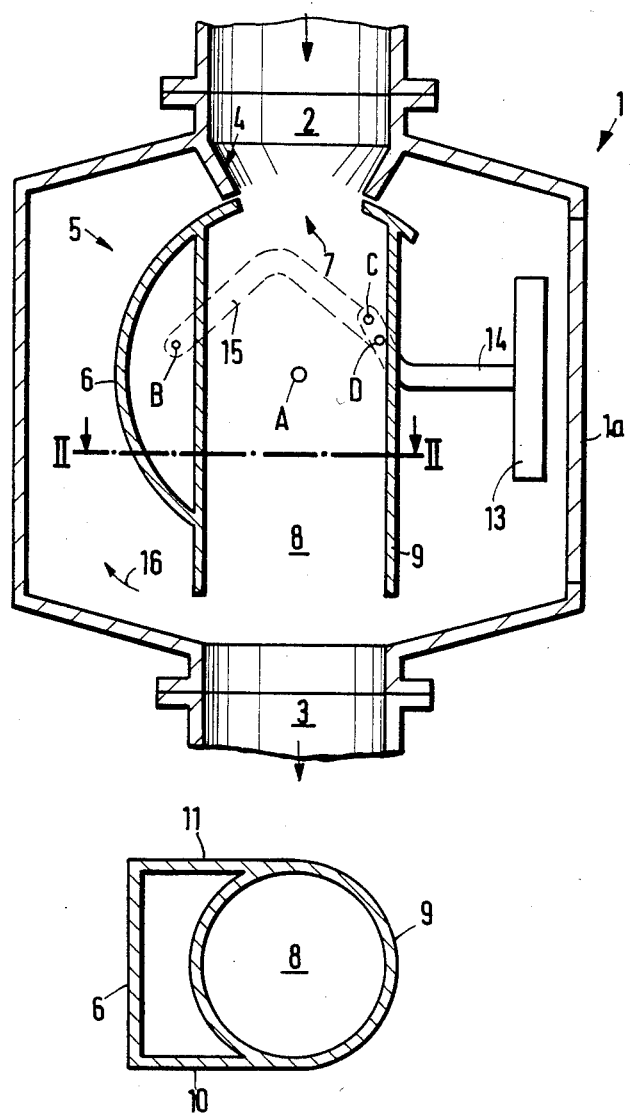

VALVE FOR USE IN GASIFICATION REACTOR

BACKGROUND OF INVENTION

1. Field of Invention

This invention relates to a valve comprising a rotary valve member, which is accommodated in a housing having an inlet port and an outlet port and serves to interrupt the passage of material which can trickle or flow.

2. Discussion of Prior Art

It is known to use rotary valve members in ducts employed for the transfer of bulk materials. It is also known to use valve discs or valve cones for a gastight closing of conduits. It is an object of this invention to provide a pressure-tight valve, in which a rotary valve member and a valve disc cooperate.

SUMMARY OF INVENTION

This is accomplished in accordance with the invention in that a valve disc is hinged to the rotary valve member and gas-tightly closes the outlet port when the inlet port is closed by the rotary valve member. The valve disc is moved in unison with the rotation of the rotary valve member. Because the two valves members are mechanically coupled, the entire valve is not susceptible to being deranged. It is gas-tight under pressure of about 2 to 150 bars.

In a preferred embodiment the valve disc is hinged to the rotary valve member by means of a valve arm, which is engaged by a link, which is pivoted to the housing. That link ensures that in the open position of the valve the valve disc is disposed entirely out of the flow path of the solids or liquids moving through the valve so that the valve disc cannot be soiled. When the valve is in its closed position, the link ensures that the valve disc is substantially centered on the valve seat to which it has been applied.

The rotary valve member has desirability for the flow of the material a guide passage which has an inside width that is smaller or approximately as large as the inside width of the outlet port. As a result, the material being handled is kept from the valve seat disposed near the outlet port and a soiling is avoided as far as possible.

BRIEF DESCRIPTION OF DRAWING

A suitable design of the valve will be explained with reference to the drawings, in which FIG. 1 is a simplified longitudinal sectional view showing the valve;

FIG. 2 is a sectional view taken on line II—II of FIG. 1;

DESCRIPTION OF SPECIFIC EMBODIMENTS

Figure 3:
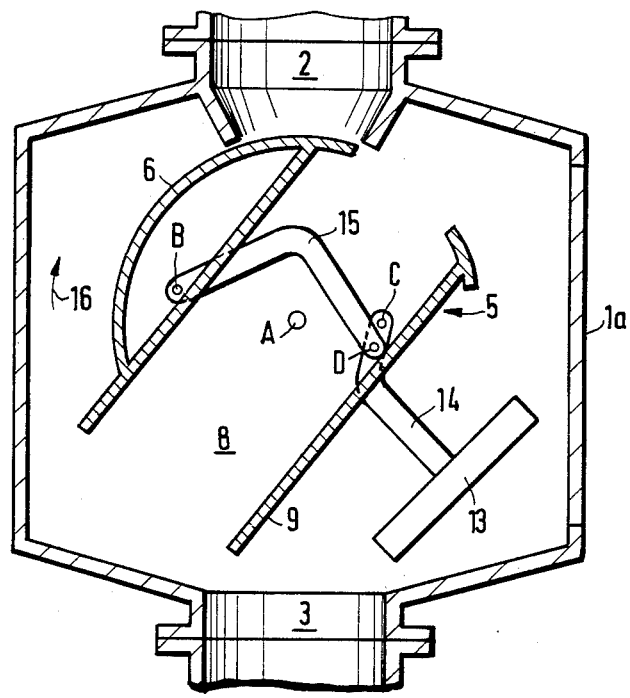
FIG. 3 shows the valve of FIG. 1 as a glass model, in a partly closed position.

The valve shown in FIG. 1 has an inlet port 2 and an outlet port 3. The inlet port 2 tapers downwardly to form an inlet funnel 4.

In the housing 1, a rotary valve member 5 is pivoted on the horizontal pivot A. The rotary valve member has a closing surface 6, which has the shape of a surface of a cylinder and is formed with a passage 7. In FIG. 1 that passage is disposed directly under the inlet funnel 4, which belongs to the housing. The rotary valve member has a guide passage 8, which is circular in cross-section and formed by the tube 9, see also FIG. 2. The front wall 10 and the rear wall 11 are shown in FIG. 2 and are disposed between the tube 9 and the closing surface 6. The cross-section of the guide passage 8 approximates the configuration of the outlet port 3. The inside width of the passage 8 is preferably somewhat smaller than the inside width of the outlet port 3 so that in the open position of the valve, shown in FIG. 1, the material trickling or flowing through the passage 8 can pass through the housing 1 virtually without contacting the wall which defines the outlet port.

To ensure a gastight closing of the outlet port 3, a valve disc 13 is provided, which is pivoted by means of a valve arm 14 to the rear side of the tube 9 on the pivot C. When the valve disc 13 is in its open position, shown in FIG. 1, the valve plate 13 is held by a curved link 15, which is connected to the arm 14 by the pivot D. The other end of the link 15 is provided with the pivot B, which is connected to the rear wall of the housing 1.

For a suitable constraint of the valve disc 13, the radius BD of the link is suitably larger than the radius AC of the pivotal axis of the valve arm 14 and preferably the angle included by the connecting lines BA and BC in the open position shown in FIG. 1 exceeds 90°.

To move the valve to its closed position, it is sufficient to turn by drive means, not shown, the rotary valve member 5 about the pivot A in the direction indicated by the arrow 16. An intermediate position will be reached first, which is shown in FIG. 3 and in which the closing surface 6 of the rotary valve member closes the inlet port 2 to prevent a further passage of solids or liquids. In this position, material which is still contained in the guide passage 8 can leave the latter because the valve disc 13 has not yet reached its closing position.

Figure 4:
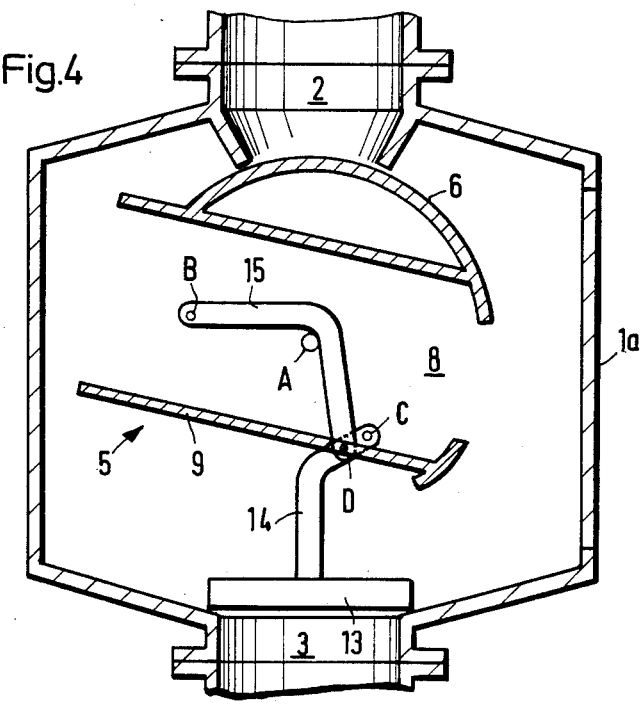
FIG. 4 shows the valve of FIG. 1 also as a glass model in a closed position.

If the pivotal movement of the valve member 5 in the direction of the arrow 16 is continued, the valve will assume the position which is shown in FIG. 4 and in which the valve disc 13 has also reached its closing position. The design of the link 15 and its association with the valve arm 14 can readily be selected so that in the final phase of the movement of the valve disc 13 to its closing position the valve disc will be moved downwardly in an approximately vertical direction so that the valve seat and the valve disc will be only slightly stressed.

To open the valve, the rotary valve member 5 is pivotally moved to the position shown in FIG. 1 opposite to the direction of the arrow 16. The valve disc is turned aside at the same time. The vertical housing wall 1a consists suitably of a removable cover 50 that maintenance and repair work on the parts of the valve can easily be performed inside the housing 1.

The valve can be used for various purposes. For instance, it can be mounted on a reactor for gasifying solid fuels under a pressure of 2 to 150 bars, particularly on the ash discharge side. As has been explained hereinbefore, the valve ensures that the hot ash will not contact the seat provided for the valve disc 13 near the outlet port 3. Details of the gasification reactor have been described in Laid-open German Application No. 27 36 687 and German Patent Specification and in the corresponding U.S. Pat. Nos. 4,165,970 and 3,937,620.

What is claimed is:

1. In a valve comprising a rotary valve member and a valve disc accommodated in a housing having an inlet port and an outlet port and serving to interrupt the passage of material which can trickle or flow, said rotary valve member closing said inlet port before said valve disc closes the outlet port, said rotary valve member having a closing surface for closing said inlet port, said rotary valve member also having an inlet passage and a tube having a guide passage, the inside width of said guide passage being smaller that the inside width of said outlet port, said valve disc serving to fit on a valve seat of said outlet port, said valve disc having a valve arm pivotally fastened at the outside of said tube on a pivot C, a link having one end B pivotally fastened at said housing outside of said tube, the other end D of said link being pivotally fastened at said valve arm, said rotary valve member being pivoted on a horizontal pivot A, the distance between B and D of said link being larger than the distance between A and C and the angle including line BA and line AC exceeding 90° in the open position of said rotary valve, in the final phase of the movement of said valve disc of its position closing said outlet port said valve disc being moved in vertical direction to said valve seat, whereby the valve disc moves both rotationally and vertically to open and close said outlet port.

* * * * *